US 010884599B2

United States Patent
Angelini et al.

(10) Patent No.: US 10,884,599 B2
(45) Date of Patent: Jan. 5, 2021

(54) GRAPHICAL USER INTERFACE FOR REFOCUSING THE SCOPE OF A SERIES OF QUERIES

(71) Applicant: AMADEUS S.A.S., Biot (FR)

(72) Inventors: Christophe Angelini, Grasse (FR); Alexandra Laura Rosala, Mouans-Sartoux (FR); Axelle Petrella, Antibes (FR); Laurent Dolle, Mouans-Sartoux (FR)

(73) Assignee: AMADEUS S.A.S., Biot (FR)

( * ) Notice: Subject to any disclaimer, the term of this patent is extended or adjusted under 35 U.S.C. 154(b) by 61 days.

(21) Appl. No.: 16/420,951

(22) Filed: May 23, 2019

(65) Prior Publication Data

US 2020/0371678 A1    Nov. 26, 2020

(51) Int. Cl.
*G06F 16/9538*   (2019.01)
*G06F 3/0484*    (2013.01)
*G06F 16/9535*   (2019.01)
*G06F 3/0482*    (2013.01)

(52) U.S. Cl.
CPC ........ *G06F 3/04847* (2013.01); *G06F 3/0482* (2013.01); *G06F 16/9535* (2019.01); *G06F 16/9538* (2019.01)

(58) Field of Classification Search
CPC combination set(s) only.
See application file for complete search history.

(56) References Cited

U.S. PATENT DOCUMENTS

| 7,213,013 B1* | 5/2007 | Subramaniam ........ G06Q 10/10 707/610 |
| 8,527,499 B2* | 9/2013 | Beringer ............... G06F 3/0482 707/713 |
| 2003/0018634 A1 | 1/2003 | Shringeri et al. |
| 2006/0277198 A1* | 12/2006 | Error ..................... H04L 43/045 |
| 2009/0043762 A1 | 2/2009 | Shiverick et al. |
| 2014/0249821 A1 | 9/2014 | Kennewick et al. |
| 2015/0178407 A1 | 6/2015 | Hughes et al. |
| 2016/0224619 A1* | 8/2016 | Robichaud .......... G06F 3/04847 |

OTHER PUBLICATIONS

European Patent Office, search report issued in Application No. 20175786.1 dated Jul. 23, 2020.

(Continued)

*Primary Examiner* — Hien L Duong
(74) *Attorney, Agent, or Firm* — Thompson Hine LLP

(57) ABSTRACT

Methods, systems, and computer program products for refocusing a scope of a series of queries to obtain a final data set from a database comprising a plurality of atomic entries with each atomic entry includes a list of database fields. A list of entries are retrieved from the database in response to receiving a query. Each entry of the list of entries includes a plurality of fields and corresponds to at least one atomic entry of the database. A table is generated including a plurality of user selectable cells arranged into a plurality of rows and columns. Each row corresponds to one of the entries and each column corresponds to one of fields. A user-defined selection representing a portion of the cells is received. In response, a graphical user interface is generated having a control element that is selectable for immediately generating a second query.

18 Claims, 6 Drawing Sheets

(56) References Cited

OTHER PUBLICATIONS

Business Objects, "Business Objects Query and Analysis", product brochure, retrieved from the internet at http://www.businessobjects.com/global/pdf/products/queryanalysis/br_query_and_analysis.pdf, Copyright 2003.

Mark Rittman, "Oracle Business Intelligence 11g Developers Guide", 1st edition, McGraw-Hill Osborne Media © 2012, chapter 6 Creating Analyses, Dashboards, KPIs, and Scorecards, Saved Filters pp. 723-727.

* cited by examiner

GRAPHICAL USER INTERFACE FOR REFOCUSING THE SCOPE OF A SERIES OF QUERIES

TECHNICAL FIELD

The invention generally relates to computers and computer software, and in particular to methods, systems, and computer program products that provide a graphical user interface for building and refocusing the scope of a series of queries.

BACKGROUND

Data mining is typically used to detect patterns in large batches of data. Many businesses use data mining techniques in order to learn more about customers spending habits, and use this data to tailor their products or modify their marketing strategies to increase sales. For example, the airline industry may use data mining to determine information such as, for example, the names of passengers who book flights on a particular airline. The search may be further focused or refined by then attempting to determine specific information about each individual passenger, such as an amount of money that was refunded to a particular passenger.

The conventional approach to search for data and to focus the results of the search to a specific subset of the data typically requires knowledge and skill in programming languages. This is because specialized programming languages such as structured query language (SQL) are usually required to search a database, as well as to focus the results of the search. Specifically, conventional data mining techniques require a user to have knowledge of a language for communicating with a database.

Analysis of the data stored within a database may also require the user to create complex nested queries. Nested queries may also be referred to as subqueries. A nested query is a query within another main query, and returns data that will be used in the main query as a condition to further restrict the data to be retrieved from the database. However, many business analysts and other personnel within an organization usually may not have the knowledge and skills related to programming that are necessary to build a complex nested query. As a result, these analysts may only be able to build very basic queries that do not analyze the data as thoroughly as needed. In addition to these drawbacks, the execution time required for a computer to process complex nested queries is usually in the range of several minutes to even several hours based on the complexity of the search.

Thus, improved methods, systems, and computer program products for providing a user-friendly, intuitive, and natural way to implement complex queries are needed.

SUMMARY

In an embodiment of the invention, a system for obtaining a final data set from a database comprising a plurality of atomic entries with each atomic entry comprising a list of database fields is provided. The system comprises one or more processors and a memory coupled to the processors. The memory storing data comprises a database and program code that, when executed by the processors, causes the system to retrieve a list of first entries from the database in response to receiving a first query. Each first entry of the list of entries includes a plurality of first fields and corresponds to at least one atomic entry of the database. The system is further caused to generate a first table for display upon a display screen. The first table includes a first plurality of cells that are selectable by a user. The first plurality of cells are arranged into a first plurality of rows and a first plurality of columns. Each row of the first plurality of rows corresponds to one of the first entries and each column of the first plurality of columns corresponds to one of the plurality of first fields. The system is also caused to receive a first user-defined selection that represents a portion of the first plurality of cells of the first table. In response to receiving the first user-defined selection, the system is caused to generate a first graphical user interface for display upon the display screen. The first graphical user interface includes a first control element that is selectable by the user for immediately generating a second query. The system is then caused to determine that the user has selected the first control element. Finally, in response to determining that the user has selected the first control element, the system is caused to generate a second graphical user interface for display upon the display screen. The second graphical user interface includes a first interface for selecting database fields for building a second query. The final data set is the result of the second query filtered by said first query filter.

In another embodiment, the program code, when executed by the one or more processors, further causes the system to retrieve a list of second entries from the database in response to receiving the second query. Each second entry includes a second plurality of second fields and corresponds to at least one atomic entry of the database. The system is also caused to generate a second table for display upon the display screen. The second table includes a second plurality of cells that are selectable by the user. The second plurality of cells are arranged into a second plurality of rows and a second plurality of columns. Each row of the second plurality of rows corresponds to one of the plurality of second fields and each column of the second plurality of columns corresponds to one of the plurality of second fields.

In yet another embodiment, the program code, when executed by the one or more processors, further causes the system to receive a second user-defined selection that represents a portion of the second plurality of cells of the second table. In response to receiving the second user-defined selection, the system is caused to generate a third graphical user interface for display upon the display screen. The third graphical user interface includes a second control element that is selectable by the user. The system is also caused to determine that the user has selected the second control element. In response to determining that the user has selected the second control element, the system is caused to generate a fourth graphical user interface for display upon the display screen. The fourth graphical user interface includes a second interface for building a third query that is based in part on the second user-defined selection of the second table.

In one embodiment, the program code, when executed by the one or more processors, further causes the system to determine that the user has not selected the first control element. In response to determining that the user has not selected the first control element, the system is caused to store the first user-defined selection as an implicit filter in a filter library.

In still another embodiment, the program code, when executed by the one or more processors, further causes the system to generate a fifth graphical user interface for display upon the display screen. The fifth graphical user interface displays the implicit filter. The system is also caused to determine that the user has selected the implicit filter. In response to determining that the user has selected the implicit filter, the system is caused to convert the implicit filter into a set of equivalent static search criterion for generating a third table.

In another embodiment, the fifth graphical user interface includes a displayed data panel that includes a list of search criteria. Each search criteria corresponds to a particular column of the first plurality of columns of first table.

In yet another embodiment, the fifth graphical user interface includes a filter menu that displays a plurality of implicit filters stored in the filter library.

In one embodiment, the first query further comprises a sort criteria that indicates a chronological order that the first plurality of rows are arranged in within the first table.

In yet another embodiment, the first control element is a checkbox.

In an embodiment, the database contains data related to airline flight management.

In yet another embodiment, a method for obtaining a final data set from a database comprising a plurality of atomic entries with each atomic entry comprising a list of database fields is provided. The method includes retrieving a list of first entries from the database in response to receiving a first query. Each first entry of the list of entries includes a plurality of first fields and corresponds to at least one atomic entry of the database. A table for display upon a display screen is generated. The table includes a first plurality of cells that are selectable by a user. The first plurality of cells are arranged into a first plurality of rows and a first plurality of columns. Each row of the first plurality of rows corresponds to one of the first entries and each column of the first plurality of columns corresponds to one of the plurality of first fields. The method includes receiving, by the computer, a first user-defined selection that represents a portion of the first plurality of cells of the first table. In response to receiving the first user-defined selection, the method further includes generating a first graphical user interface for display upon the display screen. The first graphical user interface includes a first control element that is selectable by the user for immediately generating a second query. The method also includes determining that the user has selected the first control element. Finally, in response to determining that the user has selected the control element, the method includes generating a second graphical user interface for display upon the display screen. The second graphical user interface includes an first interface for selecting database fields for building the second query. The final data set is the result of the second query filtered by said first query filter.

In another embodiment of the invention, a computer program product for obtaining a final data set from a database comprising a plurality of atomic entries with each atomic entry comprising a list of database fields is provided. The computer program product comprises a non-transitory computer-readable storage medium and program code stored on the non-transitory computer-readable storage medium that, when executed by one or more processors, causes the one or more processors to retrieve a list of first entries from the database in response to receiving a first query. Each first entry of the list of entries includes a plurality of first fields and corresponds to at least one atomic entry of the database. The one or more processors are further caused to generate a first table for display upon a display screen. The table includes a first plurality of cells that are selectable by a user. The first plurality of cells are arranged into a first plurality of rows and a first plurality of columns. Each row of the first plurality of rows corresponds to one of the first entries and each column of the first plurality of columns corresponds to one of the plurality of first fields. The one or more processors are also caused to receive a first user-defined selection that represents a portion of the first plurality of cells of the first table. In response to receiving the first user-defined selection, the one or more processors are caused to generate a first graphical user interface for display upon the display. The first graphical user interface includes a first control element that is selectable by the user for immediately generating a second query. The one or more processors are then caused to determine that the user has selected the first control element. Finally, in response to determining that the user has selected the first control element, the one or more processors are caused to generate a second graphical user interface for display upon the display screen. The second graphical user interface includes a first interface for selecting the database fields for building the second query. The final data set is obtained as a result of the second query filtered by said first query filter.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
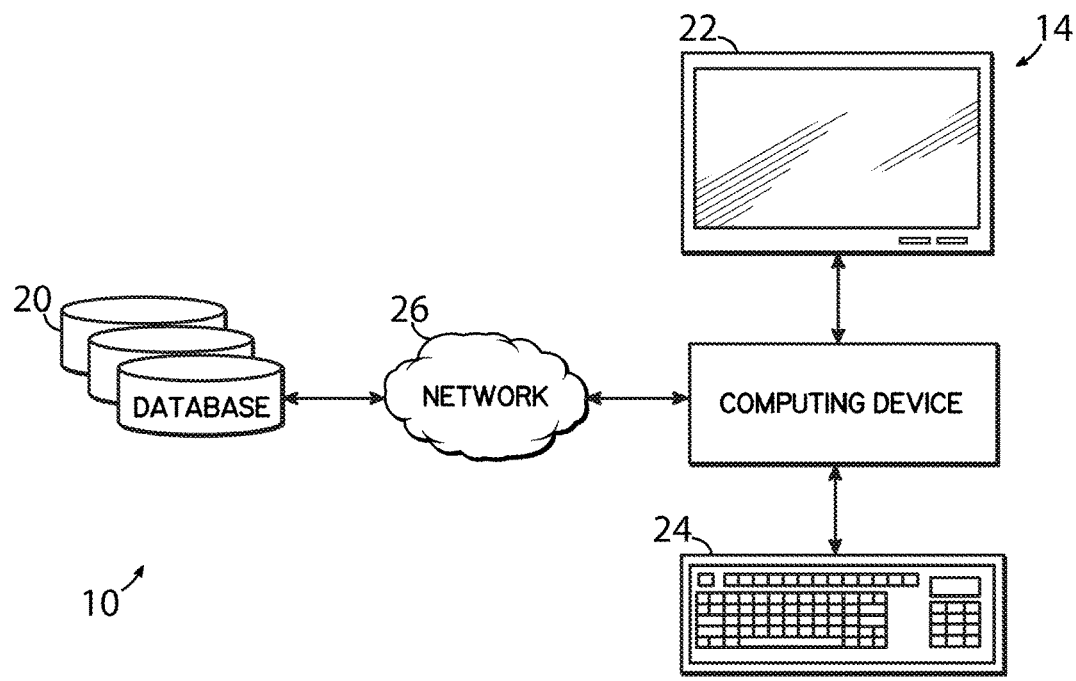
FIG. 1 is a diagrammatic view of an exemplary operating environment including one or more computing devices for to obtain a final data set from a database comprising a plurality of atomic entries with each atomic entry comprising a list of database fields.

Referring now to FIG. 1, an operating environment 10 in accordance with an embodiment of the invention may including one or more computing devices 14 and one or more databases 20. The computing devices 14 and the database 20 may communicate through a network 26. The network 26 may include one or more private or public networks (e.g., the Internet) that enable the exchange of data. As explained in greater detail below, the computing device 14 follows a specific set of rules or instructions for refocusing the scope of a set of queries to obtain a final data set from a database, which thereby allows for data mining to be performed without significant knowledge of specialized database searching languages such as, for example, structured query language (SQL).

The computing devices 14 may each comprise a desktop computer, laptop computer, tablet computer, smart phone, or any other suitable computing device. In one embodiment, an end user such as, for example, a business analyst may use a computing devices 14 to search the databases 20. In the exemplary embodiment as shown in FIG. 1, the computing device 14 is illustrated as a desktop computer including a display 22 and a user interface 24. Specifically, the user interface 24 is illustrated as a keyboard, which enables a user to enter input such as search criteria. However, the embodiment as shown in FIG. 1 is merely an exemplary illustration of the computing device 14. Thus, in another approach the user interface 24 may be a touchscreen that is integrated with the display 22.

Each database 20 contains data that is analyzed based on iterative queries that are created by the user of the computing devices 14. In one non-limiting embodiment, the databases 20 contain data related to airline flight management. For example, the databases 20 may include the International Air Transport Association (IATA) codes for the world's airlines, the airline's respective names, any alliance associated with the airline, the airline's revenue balance, and other related information pertaining to the airlines. Additionally, the databases 20 may also contain the names of the passengers of each airline, the revenue associated with each passenger, and refund data associated with each passenger. Although airline data is described in the embodiments below, it is to be appreciated that the present disclosure is not limited to refocusing a scope of a set of queries related to airline data. Instead, the databases 20 may contain data related to other applications as well such as, but not limited to, banking data, telecom data, public utility data, social utility data, and the like.

Figure 2:
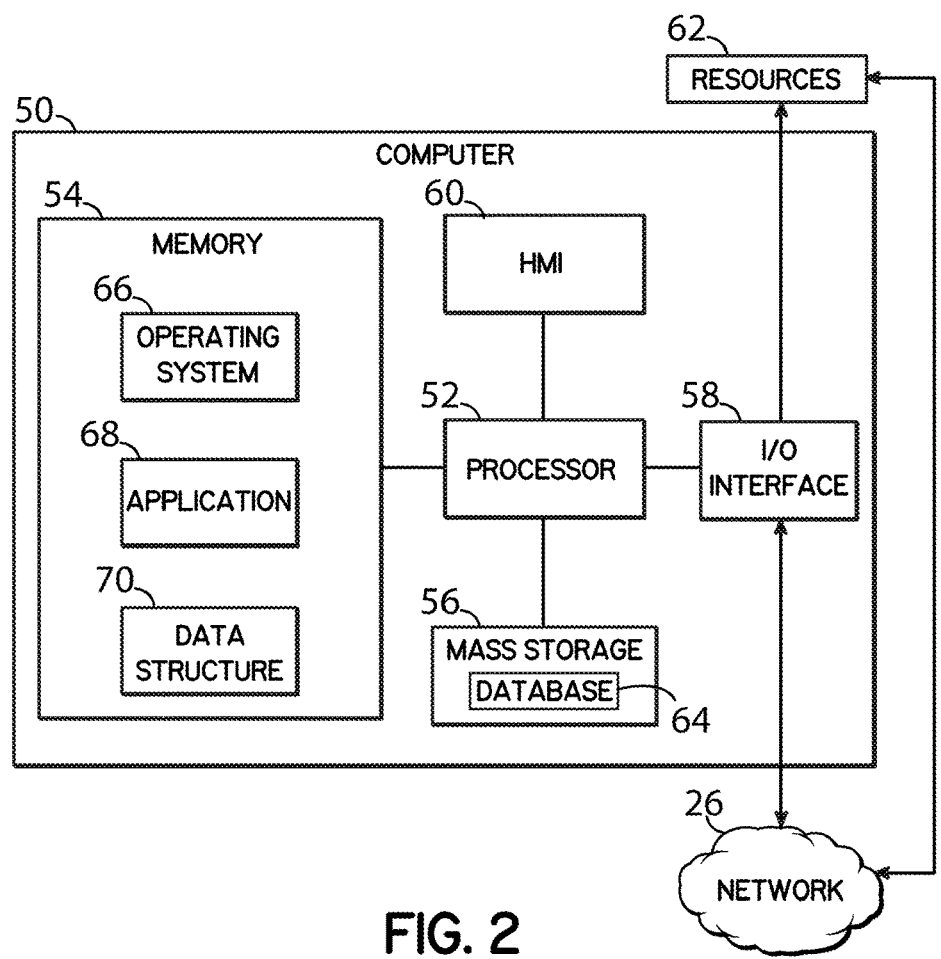
FIG. 2 is a diagrammatic view of an exemplary computer system of FIG. 1.

Referring now to FIG. 2, the computing devices 14 of operating environment 10 may be implemented on one or more computer devices or systems, such as exemplary computer system 50. The computer system 50 may include a processor 52, a memory 54, a mass storage memory device 56, an input/output (I/O) interface 58, and a Human Machine Interface (HMI) 60. The computer system 50 may also be operatively coupled to one or more external resources 62 via the network 26 or I/O interface 58. External resources may include, but are not limited to, servers, databases, mass storage devices, peripheral devices, cloud-based network services, or any other suitable computer resource that may be used by the computer system 50.

The processor 52 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 54. Memory 54 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 56 may include data storage devices such as a hard drive, optical drive, tape drive, volatile or non-volatile solid state device, or any other device capable of storing information.

The processor 52 may operate under the control of an operating system 66 that resides in memory 54. The operating system 66 may manage computer resources so that computer program code embodied as one or more computer software applications, such as an application 68 residing in memory 54, may have instructions executed by the processor 52. In an alternative embodiment, the processor 52 may execute the application 48 directly, in which case the operating system 66 may be omitted. One or more data structures 70 may also reside in memory 54, and may be used by the processor 52, operating system 66, or application 68 to store or manipulate data.

The I/O interface 58 may provide a machine interface that operatively couples the processor 52 to other devices and systems, such as the network 26 or external resource 62. The application 68 may thereby work cooperatively with the network 26 or external resource 62 by communicating via the I/O interface 58 to provide the various features, functions, applications, processes, or modules comprising embodiments of the invention. The application 68 may also have program code that is executed by one or more external resources 62, or otherwise rely on functions or signals provided by other system or network components external to the computer system 50. Indeed, given the nearly endless hardware and software configurations possible, persons having ordinary skill in the art will understand that embodiments of the invention may include applications that are located externally to the computer system 50, distributed among multiple computers or other external resources 62, or provided by computing resources (hardware and software) that are provided as a service over the network 26, such as a cloud computing service.

The HMI 60 may be operatively coupled to the processor 52 of computer system 50 in a known manner to allow a user to interact directly with the computer system 50. The HMI 60 may include video or alphanumeric displays, a touch screen, a speaker, and any other suitable audio and visual indicators capable of providing data to the user. The HMI 60 may also include input devices and controls such as an alphanumeric keyboard, a pointing device, keypads, pushbuttons, control knobs, microphones, etc., capable of accepting commands or input from the user and transmitting the entered input to the processor 52.

A database 64 may reside on the mass storage memory device 56, and may be used to collect and organize data used by the various systems and modules described herein. The database 64 may include data and supporting data structures that store and organize the data. In particular, the database 64 may be arranged with any database organization or structure including, but not limited to, a relational database, a hierarchical database, a network database, or combinations thereof. A database management system in the form of a computer software application executing as instructions on the processor 52 may be used to access the information or data stored in records of the database 64 in response to a query, where a query may be dynamically determined and executed by the operating system 66, other applications 68, or one or more modules.

Turning back to FIG. 1, the user enters an initial query using the user interface 24 of the computing device 14. In response to receiving the initial query, the computing device 14 retrieves a list of entries from one or more databases 20 ("databases 20") comprising a plurality of atomic entries with each atomic entry comprising a list of database fields. Each entry among the plurality of entries includes a plurality of fields. Moreover, each entry corresponds to at least one atomic entry among the plurality of atomic entries comprising database 20.

Figures 3, 4:
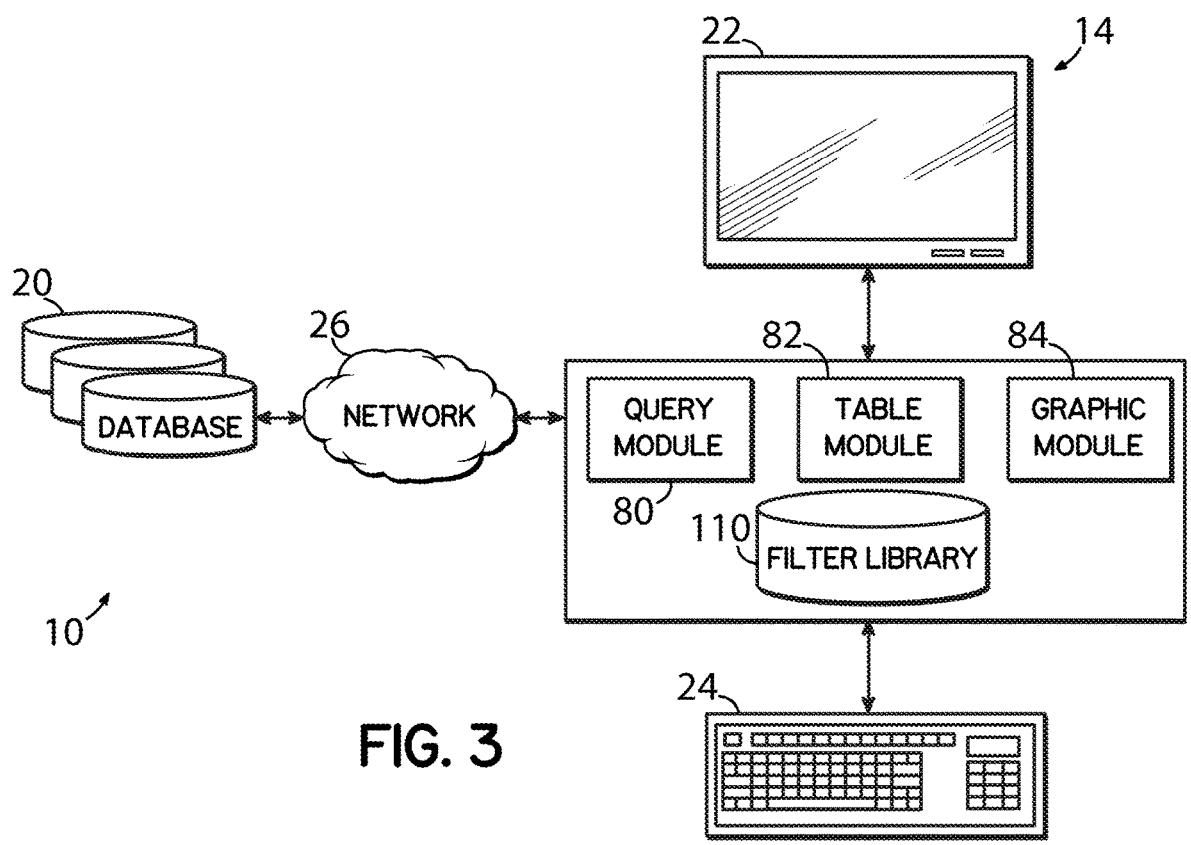
FIG. 3 is a diagrammatic view of the computing device shown in FIG. 1 in communication with one or more databases to obtain the final data set, where the computing device includes a filter library for storing one or more implicit filters.
FIG. 4 is an exemplary table that is created in response to receiving a query from a user, where a user-defined selection of a portion of the table is shown highlighted.

Turning now to FIG. 3, the computing device 14 includes a query module 80, a table module 82, and a graphic module 84, which are each in communication with one another and exchange data. The modules 80, 82, 84 are shown as distinct components, which may indicate the use of modular programming techniques. However, the software design may decrease the extent to which the modules 80, 82, 84 are distinct by combining at least some program functions of multiple modules into a single module. Moreover, those of ordinary skill in the art will readily understand that the functions attributed to the modules 80, 82, 84 may be distributed in other ways, or on other systems than those depicted. Thus, embodiments of the invention are not limited to the specific arrangement of systems or modules shown in FIG. 3.

The query module 80 is in communication with the databases 20 through the network 26. In response to receiving the initial query from the user interface 24, the query module 80 retrieves the list of entries from the databases 20. The table module 82 then generates a table 94, which is illustrated in FIG. 4, upon the display 22 for viewing by the user. Turning now to FIG. 4, the table 94 includes a plurality of cells 96 arranged into a plurality of rows 98 and a plurality of columns 100. Each row among the plurality of rows 98 corresponds to one entry of the list of entries retrieved from the databases 20. Each column among the plurality of columns 100 corresponds to one field among the plurality of fields comprising a particular entry of the list of entries. In one embodiment, each cell of the plurality of cells 96 contains a single value for a particular field of a corresponding column related to a particular entry of a corresponding row.

In an embodiment, the plurality of columns 100 represent search criteria included in the initial query. In the example of FIG. 4, the search criteria represented by the columns 100 include: an operating airline, an origin airport, a fare amount, and a tax amount. In an embodiment, values for the search criteria represented by the columns 100 are provided in the plurality of rows 98 for each entry of the list of entries. In the example of FIG. 4, values provided in the plurality of rows 98 for the "Operating Airline" search criterion are the names of the operating airlines are abbreviated as two-letter codes based on their IATA airline designators. For example, the abbreviation "AA" stands for American Airlines. Also, in FIG. 4, values provided in the plurality of rows for the "Origin Airport" search criterion are the origin airport locations are abbreviated based on their IATA three-letter codes. For example, the abbreviation "LHR" stands for Heathrow Airport, the abbreviation "NCL" stands for Newcastle Airport, the abbreviation "LGW" stands for London (Gatwick) Airport, and the abbreviation "BSH" stands for Brighton Airport. Finally, both the fare amount and the tax amount are expressed in Great Britain Pounds (GBP). Although the monetary amounts are expressed in GPB, it is to be understood that this embodiment is merely exemplary in nature and the table 94 may include other forms of currency as well.

In one embodiment, the initial query further includes a sort criteria defining an order for arranging the plurality of rows 98. In one embodiment, the initial query identifies a particular search criterion associated with the sort criteria. By way of example, the initial query may include a sort criteria defining a chronological order associated with a "Primary Ticket Number" search criterion. Stated differently, the initial query may include a sort criteria that indicates a chronological order that the first plurality of rows 98 are arranged in within the table 94. Accordingly, the plurality of rows 98 are arranged in the chronological order based on values for the "Primary Ticket Number" search criterion provided in each row.

Upon presenting the table 94 on the display 22, the cells 96 of the table 94 are selectable by a user. Specifically, the user selects a plurality of the cells 96 arranged in a subset of the plurality of rows 98 and/or a subset of the plurality of columns 100 comprising the table 94. In FIG. 4, the cells 96 selected by the user are located in the fourth row 98, as represented by the highlighted or shaded cells 96 of the table. The highlighted cells 96 are referred to herein as a user-defined selection that represents a portion of the cells 96 of the table 94. The subset of the plurality of rows 98 (or "selected rows") corresponding to the user-defined selection defines a query filter. As explained below in greater detail, the query filter is configured to filter (or limit) query results to atomic entries of the databases that correspond to the selected rows.

Figure 5:
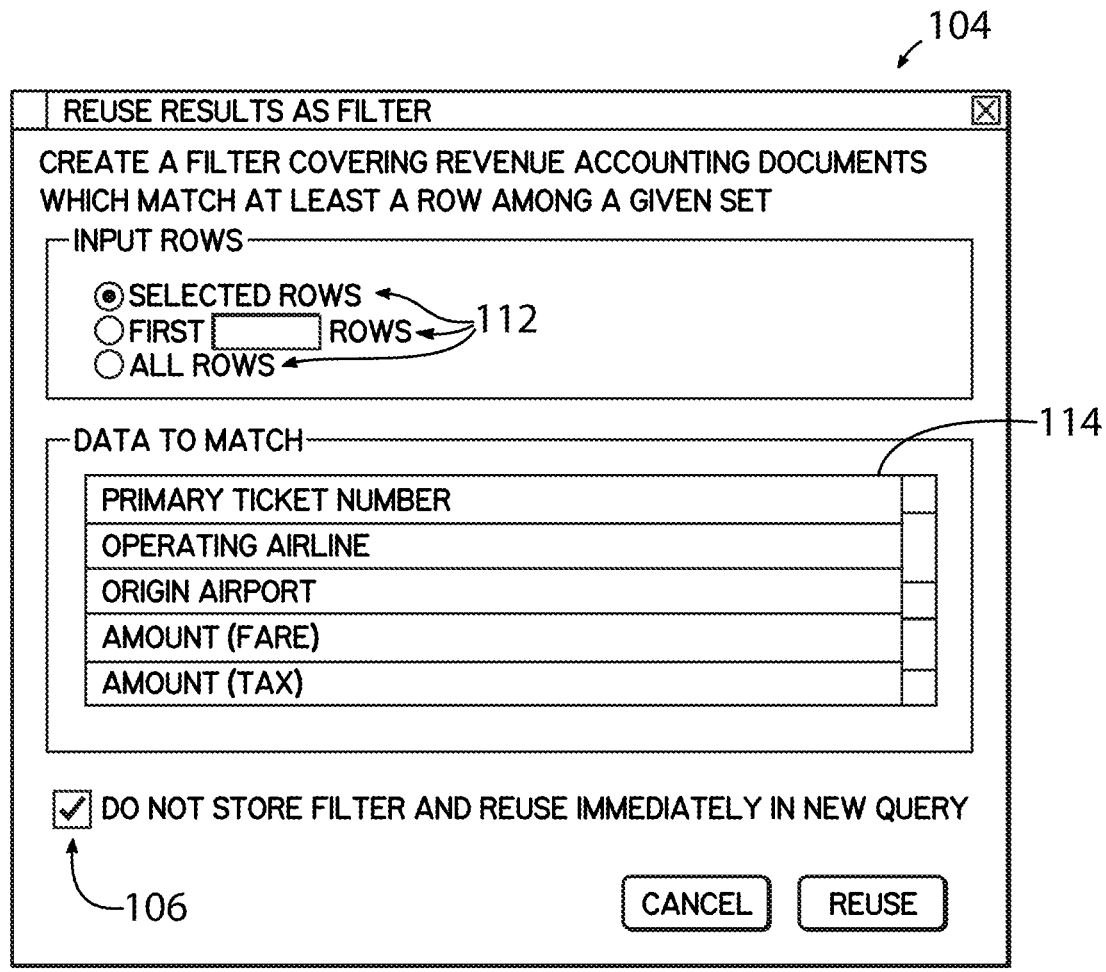
FIG. 5 is an exemplary graphical user interface including a control element illustrated as a checkbox that may be selected by the user.

Referring now to both FIGS. 3, 4, and 5, in response to receiving the user-defined selection, the graphic module 84 of the computing device 14 generates a graphical user interface 104 (FIG. 5) based on the selection of cells 96 of the table 94 (FIG. 4). As seen in FIG. 5, the graphical user interface 104 includes an interface 104 and a control element 106. The interface 104 includes a plurality of inputs 112 and a menu 114 comprising a plurality of options 118 for creating an implicit filter. The plurality of inputs 112 (depicted as radio buttons in FIG. 5) facilitate receiving a user selection of one or more entries corresponding to the plurality of rows 98 of table 94. By way of example, the plurality of inputs 112 in FIG. 5 allow for the user to select entries corresponding to: the selected rows of the user-defined selection; a specified number of first rows among the plurality of rows 98; or each of the plurality of rows 98. The menu 114 facilitates receiving a user selection of one or more search criteria (or fields) corresponding to the plurality of columns 100 of table 94. As seen in FIG. 5, each search criterion corresponds to one of the plurality of options 118 in menu 114. Accordingly, the user may select one or more search criteria corresponding to the plurality of columns 100 for use in creating an implicit filter by highlighting the respective option 118. By way of example, a user has selected the "Operating Airline" and "Fare Amount" search criteria as represented in FIG. 5 by the highlighted options among the plurality of options 118 in menu 114.

Figure 6:
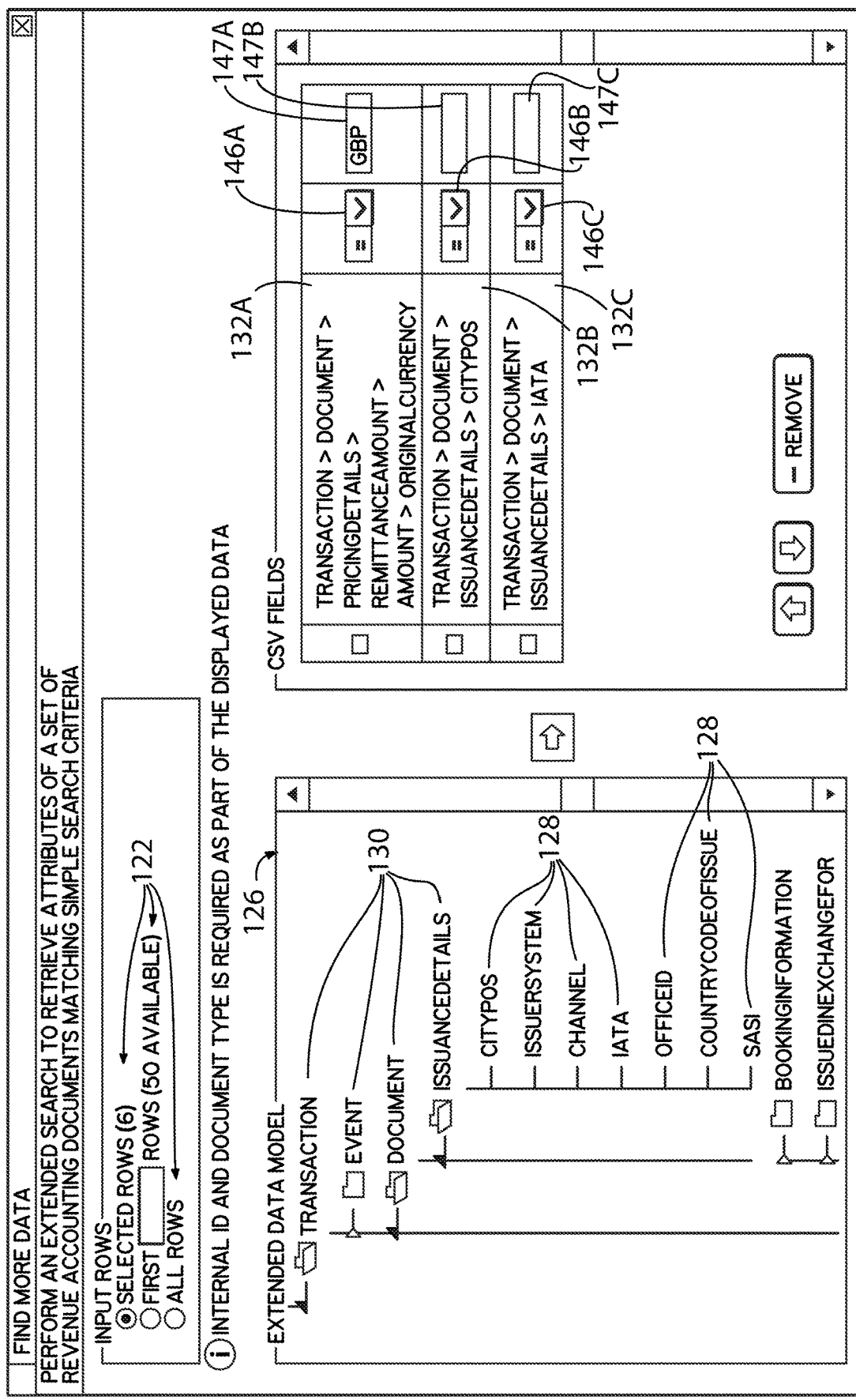
FIG. 6 is an exemplary graphical user interface for building a query that is based in part on the user-defined selection seen in FIG. 4.

Operation of the control element 106 determines what process the computing device 14 performs with an implicit filter defined using the interface 104. Specifically, if the computing device 14 determines that control element 106 is selected, the graphic module 84 of the computing device 14 generates a second graphical user interface 120, which is illustrated in FIG. 6. As discussed below in greater detail, a selection of the control element 106 provides the computing device 14 with an indication that the user wants to immediately use the implicit filter in a subsequent query. In the non-limiting embodiment as shown, the control element 106 is in the form of a checkbox, where the user selects the control element by placing a checkmark within the checkbox. The checkbox has been selected using a checkmark.

Alternatively, in response to determining that the control element 106 is not selected, the graphic module 84 of the computing device 14 saves the rows 98 and the columns 100 that are selected by the user as the implicit filter as a set of search criteria in the filter library 110 shown in FIG. 3. For example, the selected row 98 that is highlighted as well as the columns 100 representing the primary ticket number and the fare amount are saved as a set of search criteria in the filter library 110. In one embodiment, the graphical user interface 104 may also include an input or menu (not shown in FIG. 5) that may be used to name the implicit filter as well. The user may then select the implicit filter by its corresponding name at a later time from a list of various filters that are stored in the filter library 110, which is explained in greater detail below and illustrated in FIG. 8.

As discussed above with respect to FIG. 5, the graphic module 84 of the computing device 14 is configured to generate a second graphical user interface for presentation on display 22 in response to determining that the control element 106 is selected. An example of the second graphical user interface 120 is illustrated in FIG. 6. In general, the second graphical user interface 120 provides an visual interface for building a second query based, in part, on the user-defined selection seen in FIG. 4. The second graphical user interface 120 includes a plurality of inputs 122 that are illustrated in FIG. 6 as radio buttons. The plurality of inputs 122 allow for the user to select specific rows 98 that are included within the user-defined selection seen in FIG. 4. Similar to the embodiment as shown in FIG. 5, the user may want to include all of the rows 98 that are a part of the user-defined selection, a portion of the rows 98 of the user-defined selection, or all of the rows 98 of the table 94.

Figure 7:
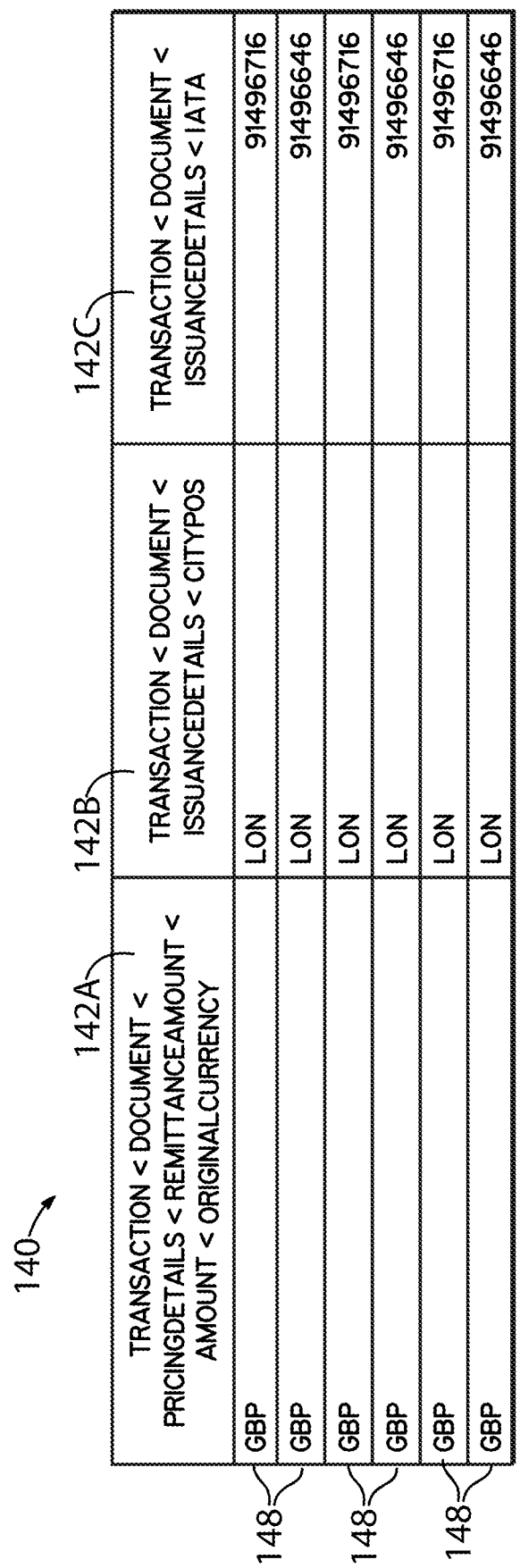
FIG. 7 is a table created by the query created by the graphical user interface shown in FIG. 6.

The second graphical user interface 120 also includes a directory 126, which allows for the user to select a specific file 128 stored in a specific folder among a plurality of folders 130 stored in databases 20 (FIG. 3). In the embodiment as shown in FIG. 6, the folders 130 are organized into a hierarchy of folders, which may also be referred to as a directory structure. Once a specific file 128 from the directory 126 is selected, then a corresponding field 132 is created on the right side of the second graphical user interface 120. As explained below, each of the corresponding fields 132 listed in the second graphical user interface 120 are used to create a column 142 of data in a table 140 (FIG. 7), where the table 140 is generated based on the selections made by the user using the graphical user interface 120. Each field 132 of the graphical user interface 120 is representative of a specific set of data stored within one of the databases 20 (FIG. 1). Specifically, each field 132 is indicative of the data stored within a specific one of the files 128.

In the embodiment shown in FIG. 6, the first field 132A reads Transaction>Document>PricingDetails>RemittanceAmount>Amount>OriginalCurrency. Therefore, the first field 132A located within the Transaction folder 130 of the directory 126 is selected. The user may also select a comparison (or relational) operator for evaluating values associated with a particular field 132 using a corresponding drop-down selector 146. Adjacent to each of the corresponding fields 132 listed in the second graphical user interface 120 is a value field 147 that allows a user to enter a specific value for a search criterion associated with that corresponding field 132. For example, adjacent to the first field 132A is a value field 147A that allows for the user to enter a specific value for the "Original Currency" search criterion associated with first field 132A. In the non-limiting embodiment as shown, the original currency is indicated in Great Britain Pounds (GBP). Referring now to both FIGS. 6 and 7, the field 132A corresponds to the column 142A, where there are six different transactions or rows 148 that are each based on Great Britain Pounds.

Similarly, the field 132B includes the data stored in the CityPOS folder that is located under IssuanceDetails. Furthermore, the column 142B of the table 140 (FIG. 7) includes six values corresponding to the data stored in the City POS folder 130. Specifically, the values each indicate "LON", where the abbreviation LON represents all flights in the London metropolitan area. As such, a user would have entered the value of "LON" into value field 147B in building the second query. The field 132C includes the data stored in the IATA folder 130 located under IssuanceDetails, where the column 142C of the table 140 includes six values that correspond to the data stored in the IATA folder 130.

Figure 8:
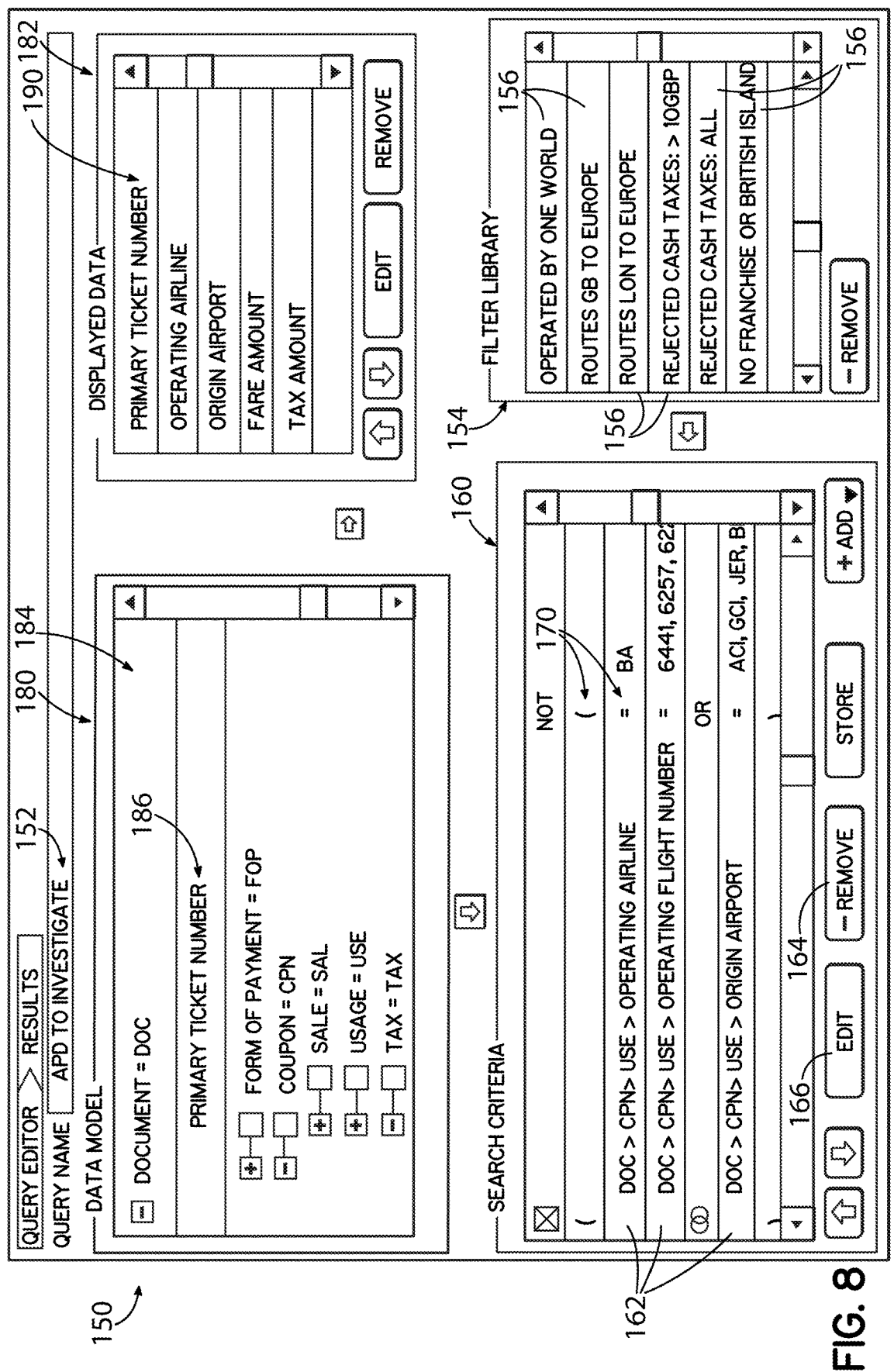
FIG. 8 is an exemplary graphical user interface that is used to build a query using an implicit filter stored in the filter library shown in FIG. 3.

As discussed above with respect to FIG. 5, the graphic module 84 of the computing device 14 is configured to save the rows 98 and the columns 100 that are selected by the user as the implicit filter in response to determining that the control element 106 is not selected. The implicit filter may be used at a later time by the user. FIG. 8 illustrates an example of a graphical user interface 150 that is generated at a later time by the graphic module 84 when the implicit filter is used. The graphical user interface 150 is shown upon the display 22 of the computing device 14.

The graphical user interface 150 includes a filter menu 154, which displays a plurality of implicit filters 156 that are stored in the filter library 110 (FIG. 3). As mentioned above, each of the plurality of implicit filters 156 were created in response to the computing device 14 determining that the user left the checkbox 106 shown in FIG. 5 unselected. FIG. 8. illustrates an embodiment in which implicit filters stored in the filter library 110 may be reused to create a new query using graphical user interface 150. For example, in the embodiment as shown in FIG. 8, the selected implicit filter 156 (named "No franchise or British islands origin") is being reused by the user to create a new query. As seen at the top of the graphical user interface 150, the new query is being named as "APD to investigate" using a query name field 152.

In response to determining that the user has selected one of the implicit filters 156 listed in the filter menu 154, the table module 82 converts the selected implicit filter 156 into a set of static search criteria 160 for generating a table (e.g., table 94 of FIG. 4). The set of static search criteria 160 include a plurality of rows 162, where each row 162 represents one of the search criterion corresponding to one of the plurality of columns 100 of the table 94. In one embodiment, a user may filter or remove one or more search criterion of the set of static search criteria 160 using an interface element 164 of graphical user interface 150 in creating the new query. For example, the user has removed the "Fare Amount" and "Tax Amount" search criteria from the set of static search criteria 160 using the interface element 164 while retaining the "Operating Airline", "Operating Flight Number", and "Origin Airport" search criteria in the set of static search criteria 160.

In one embodiment, a user may modify values (or search terms) corresponding to specific search criterion of the set of static search criteria 160 using an interface element 166 of graphical user interface 150. For example, in FIG. 8, the value corresponding to the "Operating Airline" search criterion is British Airways ("BA"); the values for the "Operating Fight Number" search criterion include 6441, 6267, 6238, 494, 451, 876, and 828; and the values for the "Origin Airport" search criterion include Alderney ("ACI"), Guernsey ("GCI"), Jersey ("JER"), Barra ("BRR"), Benbecula ("BEB"), Campbeltown ("CAL"), Isle of Man ("IOM"), and Inverness ("INV"). Using the interface element 166 of the graphical user interface 150, the user may add, remove, or modify any number of these values corresponding to the set of static search criteria 160 in creating the new query. Moreover, using the interface element 166, the user may select a relational operator 170 for use in evaluating a value corresponding to a given search criterion in the set of static search criteria 160. Specifically, the user may select a specific relational operator 170 to define a relationship between a given search criterion(e.g., the "Operating Airline" search criterion) in the set of search criteria 160 and the corresponding values (or search terms) (e.g., BA). In the example as shown, the user has selected an "Equal to" relational operator as the relational operator 170 for evaluating values corresponding to the "Operating Airline", the "Operating Flight Number", and the "Origin Airport" search criteria.

The graphical user interface 150 includes a data model panel 180 and a displayed data panel 182. Referring now to both FIGS. 4 and 8, the data model panel 180 represents locations of the data represented in the table 94 (FIG. 4). To that end, the data model panel 180 includes a directory 184, where each folder 186 of the directory 184 represents a location in the databases 20 (FIG. 4) where data in one of the plurality of columns 100 is stored. The displayed data panel 182 is indicative of a list of search criteria identify each search criterion included in the new query. In the example of FIG. 8, the list of search criteria 190 include the "Primary Ticket Number" search criterion, "Operating Airline", "Origin Airport", "Fare Amount", and "Tax Amount" search criteria. As seen in FIGS. 4 and 8, each of the individual search criterion included within the list of search criteria 190 correspond to one of the columns 100 included in the table 94. A user may select specific search criterion to include as a separate column 100 in the table 94 by selecting one of the folders 186 listed in the directory 184 of the data model panel 180, and dragging and dropping the selected folder 186 into the displayed data panel 182.

Referring generally to the figures, the disclosed system provides a unique approach for searching data and for refocusing the results of the search to obtain a final data set using a graphical user interface. Conventional approaches used for data mining and for refocusing the results of a search typically require a user to have specialized knowledge and skill in one or more specialized languages such as structured query language (SQL). However, most business analysts do not have the specialized programming skills required to create complex searches and nested queries. In contrast, the disclosed approach provides a user-friendly and intuitive approach for focusing the results of a search, without the need to create complex nested queries. Additionally, the disclosed system also provides a graphical user interface for interacting with the databases, instead of the command prompts that are conventionally used to search databases. Therefore, unlike conventional systems the disclosed approach for searching and refocusing the results of the search may be performed by business analysts and other personnel within an organization who do not have the programming skills necessary to build a nested query.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

In certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system for obtaining data set results from a database comprising a plurality of atomic entries, each atomic entry comprising a list of database fields, the system comprising:
   one or more processors; and
   a memory coupled to the one or more processors, the memory storing data comprising the database and program code that, when executed by the one or more processors, causes the system to:
      in response to receiving a first query, retrieve a list of first entries from the database, wherein each first entry includes a plurality of first fields and corresponds to at least one atomic entry of the database;
      generate a first table for display upon a display screen, wherein the first table includes a first plurality of cells that are selectable by a user, wherein the first plurality of cells are arranged into a first plurality of rows and a first plurality of columns, and wherein each row of the first plurality of rows corresponds to one of the plurality of first entries and each column of the first plurality of rows corresponds to one of the plurality of the first fields;
      receive a first user-defined selection that represents a portion of the first plurality of cells of the first table, the portion comprising one or more selected rows, by the user, that define a first query filter, the first query filter being limited to the atomic entries corresponding to the rows selected;
      in response to receiving the first user-defined selection, generate a first graphical user interface for display upon the display screen, wherein the first graphical user interface includes a first control element that is selectable by the user for immediately generating a second query;
      determine that the user has selected the first control element;
      in response to determining that the user has selected the first control element, generate a second graphical user interface for display upon the display screen, wherein the second graphical user interface includes a first interface for selecting the database fields for building the second query, wherein a returned data set is the result of the second query filtered by the first query filter;
      determine that the user has not selected the first control element; and
      in response to determining that the user has not selected the first control element:
         generate an implicit filter based on the one or more selected rows by the user corresponding to the first user-defined selection;
         store the generated implicit filter in a filter library that includes a plurality of implicit filters, wherein each implicit filter of the plurality of implicit filters is generated based on a user-defined selection corresponding to one or more selected rows by the user;
         generate a third graphical user interface for display upon the display screen, wherein the third graphical user interface displays the first implicit filter and the plurality of implicit filters;
         determine that the user has selected a particular implicit filter of the plurality of implicit filters; and
         in response to determining that the user has selected the particular implicit filter, convert the particular implicit filter into a set of equivalent static search criterion for generating search results based on the particular implicit filter.

2. The system of claim 1, wherein the program code, when executed by the one or more processors, further causes the system to:
   in response to receiving the second query, retrieve a list of second entries from the database, wherein each second entry includes a plurality of second fields and corresponds to at least one atomic entry of the database; and
   generate a second table for display upon the display screen, wherein the second table includes a second plurality of cells that are selectable by the user, wherein the second plurality of cells are arranged into a second plurality of rows and a second plurality of columns, and wherein each row of the second plurality of rows corresponds to one of the list of second entries and each column of the second plurality of columns correspond to one of the plurality of second fields.

3. The system of claim 2, wherein the program code, when executed by the one or more processors, further causes the system to:

receive a second user-defined selection that represents a portion of the second plurality of cells of the second table;

in response to receiving the second user-defined selection, generate a fourth graphical user interface for display upon the display screen, wherein the fourth graphical user interface includes a second control element that is selectable by the user, the portion comprising selected rows to define a second query filter, the second query filter being limited to the atomic entries corresponding to the rows selected;

determine that the user has selected the second control element; and in response to determining that the user has selected the second control element, generate a fifth graphical user interface for display upon the display screen, wherein the fifth graphical user interface includes a second interface for building a third query that is based in part on the second user-defined selection of the second table, wherein the data set results comprise the result of the second query filtered by the third query filter or the result of filtering by the third query filter of the data set resulting from the second query filtered by the first query filter.

4. The system of claim 1, wherein the third graphical user interface includes a displayed data panel that includes a list of search criteria, wherein each search criterion of the list of search criteria corresponds to a particular column of the first plurality of columns of the first table.

5. The system of claim 1, wherein the third graphical user interface includes a filter menu that displays the plurality of implicit filters stored in the filter library.

6. The system of claim 1 wherein the first query further comprises a sort criteria that indicates a chronological order that the first plurality of rows are arranged in within the first table.

7. The system of claim 1 wherein the first control element is a checkbox.

8. The system of claim 1 wherein the database contains data related to airline data, banking data, telecom data, public utility data, social utility data, or a combination thereof.

9. The system of claim 1, wherein the one or more selected rows comprises at least two selected rows by the user.

10. A method for obtaining data set results from a database comprising a plurality of atomic entries, each atomic entry comprising a list of database fields, the method comprising:

in response to receiving a first query, retrieving a list of first entries from the database, wherein each first entry includes a plurality of first fields and corresponds to at least one atomic entry of the database;

generating a first table for display upon a display screen, wherein the first table includes a first plurality of cells that are selectable by a user, the first plurality of cells are arranged into a first plurality of rows and a first plurality of columns, each row corresponds to one of the plurality of first entries and each column corresponds to one of the plurality of first fields;

receiving a first user-defined selection that represents a portion of the first plurality of cells of the first table, the portion comprising one or more selected rows, by the user, that define a first query filter, the first query filter being limited to the atomic entries corresponding to the rows selected;

in response to receiving the first user-defined selection, generating a first graphical user interface for display upon the display screen, wherein the first graphical user interface includes a first control element that is selectable by the user for immediately generating a second query;

determining that the user has selected the first control element;

in response to determining that the user has selected the first control element, generating a second graphical user interface for display upon the display screen, wherein the second graphical user interface includes a first interface for selecting the database fields for building the second query, wherein a returned data set is the result of the second query filtered by the first query filter;

determining that the user has not selected the first control element; and in response to determining that the user has not selected the first control element:
  generating an implicit filter based on the one or more selected rows by the user corresponding to the first user-defined selection;
  storing the generated implicit filter in a filter library that includes a plurality of implicit filters, wherein each implicit filter of the plurality of implicit filters is generated based on a user-defined selection corresponding to one or more selected rows by the user;
  generating a third graphical user interface for display upon the display screen, wherein the third graphical user interface displays the first implicit filter and the plurality of implicit filters;
  determining that the user has selected a particular implicit filter of the plurality of implicit filters; and
  in response to determining that the user has selected the particular implicit filter, converting the particular implicit filter into a set of equivalent static search criterion for generating search results based on the particular implicit filter.

11. The method of claim 10, further comprising:
in response to receiving the second query, retrieving a list of second entries from the database, wherein each second entry includes a plurality of second fields and corresponds to at least one atomic entry of the database; and generating a second table for display upon the display screen, wherein the second table includes a second plurality of cells that are selectable by the user, wherein the second plurality of cells are arranged into a second plurality of rows and a second plurality of columns, and wherein each row of the second plurality of rows corresponds to one of the plurality of second fields and each column of the second plurality of columns correspond to one of the plurality of second fields.

12. The method of claim 11 further comprising:
receiving a second user-defined selection that represents a portion of the second plurality of cells of the second table;

in response to receiving the second user-defined selection, generating a fourth graphical user interface for display upon the display screen, wherein the fourth graphical user interface includes a second control element that is selectable by the user, the portion comprising selected rows to define a second query filter, the second query filter being limited to the atomic entries corresponding to the rows selected;

determining that the user has selected the second control element; and in response to determining that the user has selected the second control element, generating a fifth graphical user interface for display upon the display screen, wherein the fifth graphical user interface includes a second interface for building a third query that is based in part on the second user-defined selection of the second table, wherein the data set results comprise the result of the second query filtered by the third query filter or the result of filtering by the third query filter of the data set resulting from the second query filtered by the first query filter.

13. The method of claim 10, wherein the third graphical user interface includes a displayed data panel that includes a list of search criteria, wherein each search criterion of the list of search criteria corresponds to a particular column of the first plurality of columns of the first table.

14. The method of claim 10, wherein the third graphical user interface includes a filter menu that displays the plurality of implicit filters stored in the filter library.

15. The method of claim 10, wherein the first query further comprises a sort criteria that indicates a chronological order that the first plurality of rows are arranged in within the first table.

16. The method of claim 10, further comprising:
selecting the first control element by placing a checkmark within a checkbox, wherein the checkbox is the first control element.

17. The method of claim 10, wherein the one or more selected rows comprises at least two selected rows by the user.

18. A computer program product for obtaining data set results from a database comprising a plurality of atomic entries, each atomic entry comprising a list of database fields, the computer program product comprising:
a non-transitory computer-readable storage medium; and
program code stored on the non-transitory computer-readable storage medium that, when executed by one or more processors, causes the one or more processors to:
in response to receiving a first query, retrieve a list of first entries from the database, wherein each first entry includes a plurality of first fields and corresponds to at least one atomic entry of the database;
generate a first table for display upon a display screen, wherein the first table includes a first plurality of cells that are selectable by a user, wherein the first plurality of cells are arranged into a first plurality of rows and a first plurality of columns, and wherein each row of the first plurality of rows corresponds to one of the plurality of first entries and each column of the first plurality of rows corresponds to one of the plurality of the first fields;
receive a first user-defined selection that represents a portion of the first plurality of cells of the first table, the portion comprising one or more selected rows, by the user, that define a first query filter, the first query filter being limited to the atomic entries corresponding to the rows selected;
in response to receiving the first user-defined selection, generate a first graphical user interface for display upon the display screen, wherein the first graphical user interface includes a first control element that is selectable by the user for immediately generating a second query;
determine that the user has selected the first control element;
in response to determining that the user has selected the first control element, generate a second graphical user interface for display upon the display screen, wherein the second graphical user interface includes a first interface for selecting the database fields for building the second query, wherein a returned data set is the result of the second query filtered by the first query filter;
determine that the user has not selected the first control element; and
in response to determining that the user has not selected the first control element:
generate an implicit filter based on the one or more selected rows by the user corresponding to the first user-defined selection;
store the generated implicit filter in a filter library that includes a plurality of implicit filters, wherein each implicit filter of the plurality of implicit filters is generated based on a user-defined selection corresponding to one or more selected rows by the user;
generate a third graphical user interface for display upon the display screen, wherein the third graphical user interface displays the first implicit filter and the plurality of implicit filters;
determine that the user has selected a particular implicit filter of the plurality of implicit filters; and
in response to determining that the user has selected the particular implicit filter, convert the particular implicit filter into a set of equivalent static search criterion for generating search results based on the particular implicit filter.

* * * * *